United States Patent
Iwamura et al.

(10) Patent No.: US 12,418,665 B2
(45) Date of Patent: *Sep. 16, 2025

(54) DECODING DEVICE, PROGRAM, AND DECODING METHOD USING CHROMA RESIDUAL SCALING

(71) Applicant: NIPPON HOSO KYOKAI, Tokyo (JP)

(72) Inventors: Shunsuke Iwamura, Tokyo (JP); Shimpei Nemoto, Tokyo (JP); Atsuro Ichigaya, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,571

(22) Filed: Jan. 23, 2024

(65) Prior Publication Data

US 2024/0195992 A1 Jun. 13, 2024

Related U.S. Application Data

(63) Continuation of application No. 18/310,191, filed on May 1, 2023, now Pat. No. 11,936,885, which is a (Continued)

(30) Foreign Application Priority Data

Dec. 17, 2020 (JP) .................. 2020-209556

(51) Int. Cl.
*H04N 11/02* (2006.01)
*H04N 19/119* (2014.01)
(Continued)

(52) U.S. Cl.
CPC ......... *H04N 19/186* (2014.11); *H04N 19/119* (2014.11); *H04N 19/124* (2014.11); (Continued)

(58) Field of Classification Search
CPC ........................................... H04N 19/186
(Continued)

(56) References Cited

U.S. PATENT DOCUMENTS

2017/0048552 A1* 2/2017 An .............. H04N 19/60
2020/0267392 A1* 8/2020 Lu .............. H04N 19/82
(Continued)

OTHER PUBLICATIONS

Written Opinion of the International Searching Authority issued in PCT/JP2021/023481; mailed Jul. 20, 2021.
(Continued)

*Primary Examiner* — Leron Beck
(74) *Attorney, Agent, or Firm* — Studebaker Brackett PLLC (57) ABSTRACT

A method includes: decoding a bitstream and thereby outputting a transform coefficients for each color component of the block, a first flag indicating for each color component whether the block includes a non-zero transform coefficient, and a second flag indicating whether the block has been encoded using a color space transform that transforming a color space of a prediction residual from a color space of the original image to another color space; performing a color space inverse transform for the prediction residual restored from the transform coefficients, when the second flag indicates that the block has been encoded using the color space transform; and determining whether to perform chroma residual scaling for the prediction residual of the chrominance component, based on the first flag of a chrominance component and the second flag, the chroma residual scaling that performs scaling based on a luminance component corresponding to the chrominance component.

3 Claims, 4 Drawing Sheets

Related U.S. Application Data continuation of application No. 17/655,991, filed on Mar. 22, 2022, now Pat. No. 11,677,965, which is a continuation of application No. PCT/JP2021/023481, filed on Jun. 21, 2021.

(51) Int. Cl.

| | | |
|---|---|---|
| *H04N 19/124* | (2014.01) | |
| *H04N 19/176* | (2014.01) | |
| *H04N 19/18* | (2014.01) | |
| *H04N 19/186* | (2014.01) | |
| *H04N 19/30* | (2014.01) | |
| *H04N 19/46* | (2014.01) | |
| *H04N 19/60* | (2014.01) | |
| *H04N 19/91* | (2014.01) | |

(52) U.S. Cl.
CPC ........... *H04N 19/176* (2014.11); *H04N 19/18* (2014.11); *H04N 19/30* (2014.11); *H04N 19/46* (2014.11); *H04N 19/60* (2014.11); *H04N 19/91* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 2020/0288159 A1* | 9/2020 | Van der Auwera .. | H04N 19/186 |
| 2020/0288173 A1* | 9/2020 | Ye ........................... | H04N 19/98 |
| 2022/0201301 A1* | 6/2022 | Xiu ...................... | H04N 19/105 |

OTHER PUBLICATIONS

Benjamin Bross et al. "Versatile Video Coding (Draft 9)" Joint Video Experts Team (JVET) of ITU-T SG 16 WP 3 and ISO/IEC JTC 1/SC 29/WG 11, 18th Meeting; JVET-R2001-vA; Apr. 15-24, 2020; pp. 1-523; teleconference.

Benjamin Bross et al. "Versatile Video Coding (Draft 10)" Joint Video Experts Team (JVET) of ITU-T SG 16 WP 3 and ISO/IEC JTC 1/SC 29/WG 11, 19th Meeting; JVET-S2001-vH; Jun. 22-Jul. 1, 2020; pp. 70-75; teleconference.

Shunsuke Iwamura et al. "Scaling List for Adaptive Colour Transform" Joint Video Experts Team (JVET) of ITU-T SG 16 WP 3 and ISO/IEC JTC 1/SC 29/WG 11, 18th Meeting; JVET-R0380-v4; Apr. 15-24, 2020; pp. 1-8; teleconference.

Takeshi Tsukuba et al. "On QP Adjustment for Adaptive Color Transform" Joint Video Experts Team (JVET) of ITU-T SG 16 WP 3 and ISO/IEC JTC 1/SC 29/WG 11, 17th Meeting; JVET-Q0098-v4; Jan. 7-17, 2020; pp. 1-8; Brussels, Belgium.

Adarsh K. Ramasubramonian et al. "AHG15: Scaling Matrices for LFNST-Coded Blocks" Joint Video Experts Team (JVET) of ITU-T SG 16 WP 3 and ISO/IEC JTC 1/SC 29/WG 11, 16th Meeting; JVET-P0365-v2; Oct. 1-11, 2019; pp. 1-5; Geneva, Switzerland.

Shunsuke Iwamura et al. "[AHG15] On Scaling List for JCCR" Joint Video Experts Team (JVET) of ITU-T SG 16 WP 3 and ISO/IEC JTC 1/SC 29/WVG 11, 16th Meeting; JVET-P0608; Oct. 1-11, 2019; pp. 1-6; Geneva, Switzerland.

Shunsuke Iwamura et al. "On Deblocking Filter for ACT" Joint Video Experts Team (JVET) of ITU-T SG 16 WP 3 and ISO/IEC JTC 1/SC 29/WG 11, 19th Meeting; JVET-S0217-v2; Jun. 22-Jul. 1, 2020; pp. 1-8; teleconference; <URL:http://phenix.intevry.fr/jvet/doc_end_user/current_document.php?id=10339>.

Xiaoyu Xiu et al. "Mismatch Between Text Specification and Reference Software on Chroma Residual Scaling When ACT is Enabled" Joint Video Experts Team (JVET) of ITU-T SG 16 WP 3 and ISO/IEC JTC 1/SC 29/WG 11, 19th Meeting; JVET-S0234-v3; Jun. 22-Jul. 1, 2020; pp. 1-4; teleconference; <URL:http://phenix.intevry.fr/jvet/doc_end_user/current_document.php?id=10356>.

Benjamin Bross et al. "Versatile Video Coding (Draft 10)" Joint Video Experts Team (JVET) of ITU-T SG 16 WP 3 and ISO/IEC JTC 1/SC 29/WG 11, 19th Meeting; JVET-S2001-v7; Jun. 22-Jul. 1, 2020; pp. 1-543; teleconference; <URL:http://phenix.intevry.fr/jvet/doc_end_user/current_document.php?id=10399>.

Benjamin Bross et al. "Versatile Video Coding Editorial Refinements on Draft 10" Joint Video Experts Team (JVET) of ITU-T SG 16 WP 3 and ISO/IEC JTC 1/SC 29, 20th Meeting; JVET-T2001-v2; Oct. 7-16, 2020; pp. 1-20; teleconference.

\* cited by examiner

ALLOCATED SIGNALS TABLE =
{39, 40, 55, 70, 80, 90, 97, 97, 104, 83, 57, 55, 49, 44, 34, 30}

DECODING DEVICE, PROGRAM, AND DECODING METHOD USING CHROMA RESIDUAL SCALING

RELATED APPLICATIONS

The present application is a continuation of U.S. patent application Ser. No. 18/310,191 filed May 1, 2023, which is a continuation of U.S. patent application Ser. No. 17/655,991 filed Mar. 22, 2022, which is a continuation based on PCT Application No. PCT/JP2021/023481, filed on Jun. 21, 2021, which claims the benefit of Japanese Patent Application No. 2020-209556 filed on Dec. 17, 2020. The content of which is incorporated by reference herein in their entirety.

TECHNICAL FIELD

The present invention relates to a decoding device, a program, and a decoding method.

BACKGROUND ART

In Non Patent Literature 1, a color space transform (ACT: Adaptive Colour Transform) used for coding an RGB 4:4:4 video in Versatile Video Coding (VVC) is specified. The color space transform is a technique for transforming a prediction residual in an RGB color space into a YCgCo color space to remove a correlation between color components of the prediction residual, thereby improving encoding efficiency.

An encoding device performs an orthogonal transform for a prediction residual that has been transformed into a YCgCo color space, for each color component (Y, Cg, Co components), quantizes and entropy encodes transform coefficients, and performs stream output. A decoding device entropy decodes the transform coefficients that is transmitted, performs a color space inverse transform (inverse ACT) for a prediction residual in the YCgCo color space that is obtained by performing an inverse quantization and inverse orthogonal transform, thereby performing a transform into a prediction residual in the RGB color space, and combines the prediction residual with a predicted image to obtain a decoded image.

In VVC, a technique called chroma residual scaling (CRS) is adopted, in which a prediction residual of chrominance components is scaled according to a corresponding luminance component.

The decoding device controls whether to apply the chroma residual scaling based on a significant coefficient flag (tu_cb_coded_flag and tu_cr_coded_flag) indicating whether a non-zero transform coefficient of a chrominance component has been transmitted, to reduce a calculation amount in the chroma residual scaling. More specifically, the decoding device performs chroma residual scaling as long as the significant coefficient flag indicates that a non-zero transform coefficient of a chrominance component has been transmitted.

CITATION LIST

Non Patent Literature

Non Patent Literature 1: JVET-R2001 "Versatile Video Coding Draft 9"

DISCLOSURE OF INVENTION

A decoding device according to a first feature performs a decoding process for a block obtained by dividing an original image including a plurality of color components. The decoding device includes: an entropy decoder configured to decode a bitstream and thereby output transform coefficients being for each color component of the block, a first flag indicating for each color component whether the block includes a non-zero transform coefficient, and a second flag indicating whether the block has been encoded using a color space transform that transforming a color space of a prediction residual from a color space of the original image to another color space; an inverse quantizer/inverse transformer configured to restore the prediction residual from the transform coefficients for each color component; a color space inverse transformer configured to perform a color space inverse transform for the prediction residual, when the second flag indicates that the block has been encoded using the color space transform; and a scaler configured to perform chroma residual scaling that performs scaling the prediction residual of a chrominance component based on a luminance component corresponding to the chrominance component, wherein the scaler is configured to determine whether to perform the chroma residual scaling, based on the first flag of the chrominance component and the second flag.

A program according to a second feature causes a computer to function as the decoding device according to the first feature.

A decoding method according to a third feature is a method performing a decoding process for a block obtained by dividing an original image including a plurality of color components. The method includes: decoding a bitstream and thereby outputting transform coefficients being for each color component of the block, a first flag indicating for each color component whether the block includes a non-zero transform coefficient, and a second flag indicating whether the block has been encoded using a color space transform that transforms a color space of a prediction residual from a color space of the original image to another color space; performing a color space inverse transform for the prediction residual restored from the transform coefficients, when the second flag indicates that the block has been encoded using the color space transform; and determining whether to perform chroma residual scaling for the prediction residual of the chrominance component, based on the first flag of a chrominance component and the second flag, the chroma residual scaling performs scaling based on a luminance component corresponding to the chrominance component.

DESCRIPTION OF EMBODIMENTS

When a color space transform is applied, transform coefficients transmitted to a decoding device are of the YCgCo color space, and tu_cb_coded_flag is set to TRUE ("1") when a non-zero transform coefficient of a Cg component is present and tu_cr_coded_flag is set to TRUE ("1") when a non-zero transform coefficient of a Co component is present.

When a non-zero transform coefficient is present in any of the color components of Y, Cg, and Co, the energy thereof is distributed to each color component in an RGB color space by a color space inverse transform in the decoding device and therefore, it is highly likely to generate a prediction residual in all the color components in the RGB color space.

However, in Non Patent Literature 1, the decoding device performs the on-off control of chroma residual scaling based on tu_cb_coded_flag and tu_cr_coded_flag. Therefore, when the significant coefficient flag of a chrominance component indicates FALSE ("0"), the decoding device does not perform chroma residual scaling even when a prediction residual is generated in all color components of RGB by a color space inverse transform. As a result, chroma residual scaling is not applied properly and the encoding efficiency is reduced.

Therefore, the present disclosure aims to improve the encoding efficiency by properly applying chroma residual scaling.

An encoding device and a decoding device according to an embodiment are described with reference to the accompanying drawings. The encoding device and the decoding device according to the embodiment encode and decode videos such as MPEG (Moving Picture Experts Group) videos. In the description of the drawings below, the same or similar reference signs are used for the same or similar parts.

<Configuration of Encoding Device>

Figure 1:
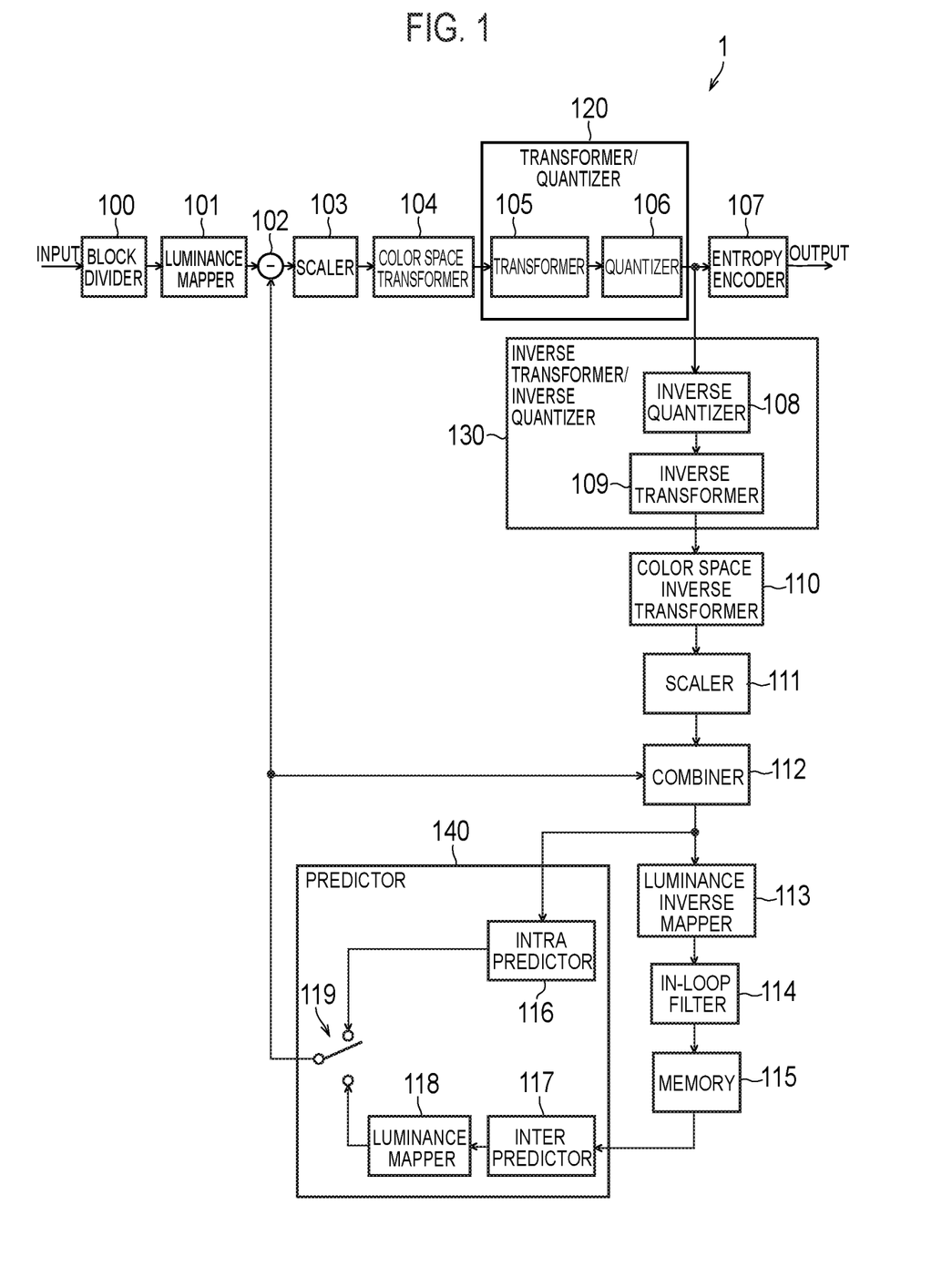
FIG. 1 is a diagram illustrating the configuration of an encoding device according to an embodiment.

A configuration of an encoding device according to the present embodiment will be described first. FIG. 1 is a diagram illustrating a configuration of an encoding device 1 according to the present embodiment.

As illustrated in FIG. 1, a encoding device 1 includes a block divider 100, a luminance mapper 101, a residual generator 102, a scaler 103, a color space transformer 104, a transformer/quantizer 120, an entropy encoder 107, an inverse quantizer/inverse transformer 130, a color space inverse transformer 110, a scaler 111, a combiner 112, a luminance inverse mapper 113, an in-loop filter 114, a memory 115, and a predictor 140.

The block divider 100 divides an original image which is an input image in frame (or picture) units that constitutes a video into a plurality of image blocks and outputs the image blocks obtained by division to the residual generator 102. The size of the image blocks may be 32×32 pixels, 16×16 pixels, 8×8 pixels, or 4×4 pixels. The shape of the image blocks is not limited to square and may be rectangular (non-square). The image block is a unit (encoding-target block) in which the encoding device 1 performs encoding and is a unit (decoding-target block) in which a decoding device performs decoding. Such an image block is sometimes referred to as a CU (Coding Unit).

An input image may be an RGB signal and have 4:4:4 chroma format. The RGB color space is one example of a first color space. A "G" component corresponds to a first color component, a "B" component corresponds to a second color component, and an "R" component corresponds to a third color component. The block divider 100 performs block division for each of the R component, G component, and B component that constitute an image, to output a block for each color component. In the following description of the encoding device, it is simply referred to as a encoding-target block when individual color components are not distinguished from each other.

The luminance mapper 101 performs a mapping process for each pixel value in the encoding-target block of a luminance component that is outputted by the block divider 100, based on a mapping table, thereby generating and outputting a new luminance-component encoding-target block for which mapping has been performed.

Figure 2:
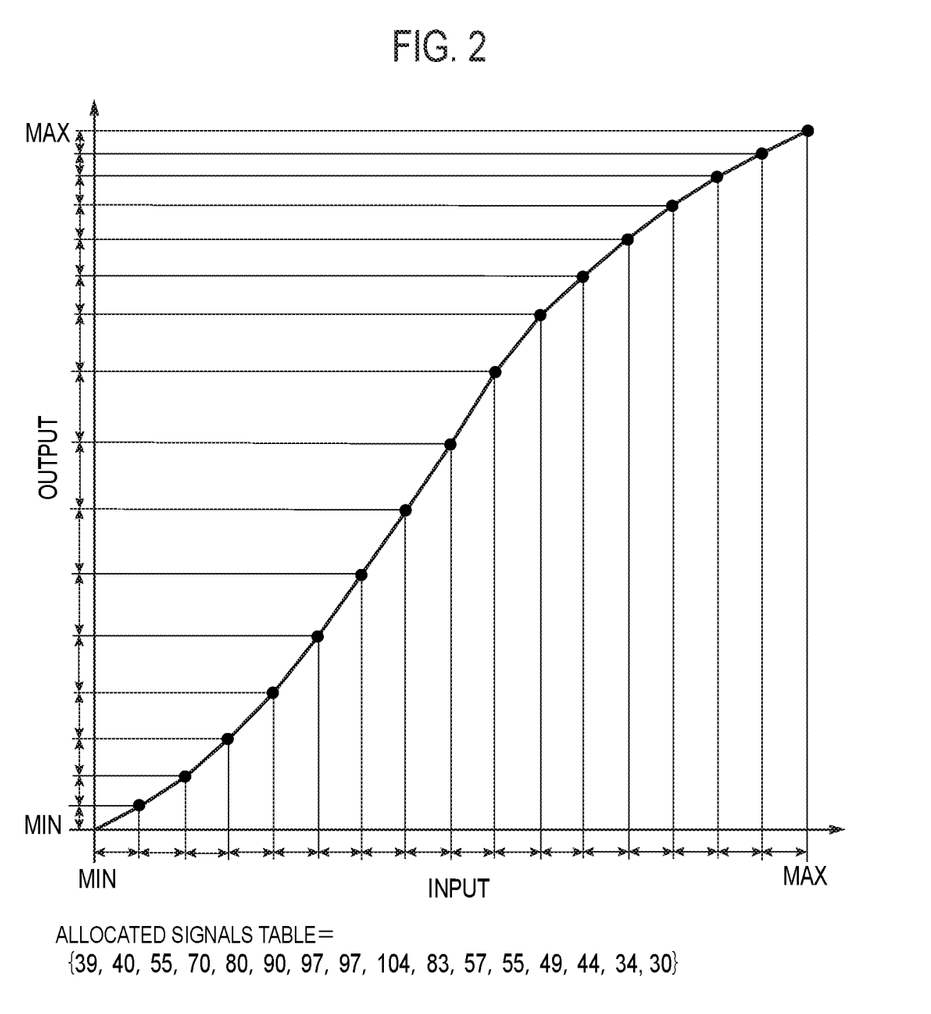
FIG. 2 is a graph illustrating an example of a relationship between an input pixel value and an output pixel value in a luminance mapping process according to the embodiment.

FIG. 2 is a graph that illustrates an example of a relationship between an input pixel value and an output pixel value in a luminance mapping process according to the present embodiment. In FIG. 2, a horizontal axis represents an input signal value and a vertical axis represents an output signal value.

As illustrated in FIG. 2, the mapping table is a table set for one or a plurality of slices and is a coefficient table for indicating a relationship between an input signal before the mapping process and an output signal after the mapping process. More specifically, the mapping table stores a value indicating the number of pixel values in an output signal after transform that are allocated for bands obtained by dividing, into a predetermined number (N), values of the minimum value to the maximum value that an input signal before mapping (pixel values to be mapped) can take.

For example, a mapping table will be described by using, as an example, a case in which the number of bands "N" is set to 16 in the mapping process for a 10-bit image signal. The minimum value 0 to the maximum value 1023 that an input signal before mapping can take are allocated as corresponding input signals to respective equally divided bands. For example, the first band corresponds to the input pixel values 0 to 63. In addition, the second band corresponds to the input pixel values 64 to 127. In a similar manner, input signals are allocated up to the 16-th band.

Each band corresponds to the position of each coefficient in the mapping table. Each coefficient stored in the mapping table indicates the number of output pixel values allocated in each band. For example, a mapping table is such that $lmcs_{cw}=\{39, 40, 55, 70, 80, 90, 97, 97, 104, 83, 57, 55, 49, 44, 34, 30\}$, output pixel values corresponding to the first band are 0 to 38 and output pixel values corresponding to the second band are 39 to 78. Allocation to the third to 16-th bands is also performed in a similar manner. When a value corresponding to a certain band in the mapping table is large, the number of output pixel values allocated to the band increases; conversely, when small, the number of output pixel values allocated to the band decreases.

A mapping table may be set by the encoding device 1 according to the frequency of occurrence of luminance signal values in one or a plurality of slices of original images or may be selected by the encoding device 1 from among a plurality of mapping tables specified in a system in advance, or a mapping table specified in a system in advance may be used. The mapping table may store a value indicating the number of pixel values of an input signal before transform that are allocated for bands obtained by dividing, into a predetermined number, values of the minimum value to the maximum value that an output signal after mapping can take, or may quantize and hold values in the mapping table, and thus, as long as it indicates a relationship between an input signal and an output signal before and after mapping, it is not limited to the above example.

In addition, in a case where a mapping table is set by the encoding device 1 according to the frequency of occurrence of a luminance signal value or in a case where it is selected from among a plurality of mapping tables, the encoding device 1 transmits information on the mapping table to a decoding device 2 by any means. For example, the encoding device 1 may entropy encode information on values in the table and perform stream output. In addition, based on format information of a video (for example, a parameter indicating a relationship between an optical signal and an electric signal in a video signal), mapping tables prepared in advance may be switched between the encoding device 1 and the decoding device 2.

The residual generator 102 calculates a prediction residual that represents a difference (error) between an encoding-target block that is outputted from the block divider 100 and a prediction block obtained by the predictor 140 predicting the encoding-target block. More specifically, the residual generator 102 calculates, for each color component, a prediction residual by subtracting each pixel value in the prediction block from each pixel value in the encoding-target block, and outputs the calculated prediction residual. That is, the residual generator 102 generates a prediction residual of each color component by a difference between a encoding-target block of each color component and a prediction block of each color component.

The scaler 103 performs chroma residual scaling for a prediction residual of a chrominance component that is outputted by the residual generator 102. The chroma residual scaling is a process of scaling a prediction residual of a chrominance component according to a corresponding luminance component. If the luminance mapper 101 does not perform luminance mapping, the chroma residual scaling is disabled.

The chroma residual scaling depends on an average value of decoded adjacent luminance pixel values on an upper side and/or left side of an encoding-target block. The scaler 103 determines an index $Y_{Idx}$ from the average value avgYr of the decoded adjacent luminance pixel values and determines a scaling coefficient $C_{ScaleInv}$ by cScaleInv[$Y_{Idx}$]. Here, cScaleInv[ ] is a lookup table. While the luminance mapping is performed for each pixel value, the scaler 103 performs chroma residual scaling for the whole encoding-target block of a chrominance component. More specifically, when the prediction residual of a chrominance component is defined as $C_{Res}$, the scaler 103 calculates and outputs the prediction residual of the chrominance component after scaling, $C_{ResScale}$, by $C_{Res}*C_{Scale}$, or $C_{Res}/C_{ScaleInv}$.

The color space transformer 104 performs a color space transform for the prediction residual of each color component and outputs the prediction residual after the color space transform. For example, the color space transformer 104 generates a prediction residual in YCgCo color space by performing the following transform calculation for the R component, G component, and B component of the prediction residual of the encoding-target block.

$Co=R-B$ $t=B+(Co>>1)$ $Cg=G-t$ $Y=t+(Cg>>1)$

Where ">>" represents a right shift operation. In addition, the "Y" component corresponds to a first color component, the "Cg" component corresponds to a second color component, and the "Co" component corresponds to a third color component. Such a YCgCo color space is one example of a second color space.

It should be noted that it is only necessary in the color space transform by the color space transformer 104 to generate a prediction residual that is composed of new color components through addition, subtraction, multiplication, division, shift processing, and the like. In addition, the color space transform does not need to be a transform that affects all color components. For example, the color space transformer 104 may adopt a color space transform in which the first color component is held without being changed, an average value of the second color component and the third color component is used as a new second color component, and a difference between the second color component and the third color component is used as a new third color component.

The transformer/quantizer 120 performs a transform process and a quantization process in units of blocks for each color component. The transformer/quantizer 120 includes a transformer 105 and a quantizer 106.

The transformer 105 performs a transform process for a prediction residual (referred to as a prediction residual irrespective of whether a color space transform is applied) to calculate transform coefficients, and outputs the calculated transform coefficients. More specifically, the transformer 105 performs a transform process in units of blocks for the prediction residual of each color component, thereby generating transform coefficients of each color component. It is only required that the transform process is a frequency transform such as a discrete cosine transform (DCT), a discrete sine transform (DST), or a discrete wavelet transform, for example. In addition, the transformer 105 outputs information on the transform process to the entropy encoder 107.

The transform process includes a transform skip in which a transform process is not performed. The transform skip includes a transform in which a transform process is applied only horizontally and also a transform in which a transform process is applied only vertically. In addition, the transformer 105 may perform a secondary transform process in which another transform process is further applied to the transform coefficients obtained by the transform process. The secondary transform process may be applied only to a partial area of the transform coefficients.

The quantizer 106 quantizes the transform coefficients that are outputted by the transformer 105, by using a quantization parameter and a scaling list; and outputs the quantized transform coefficients. In addition, the quantizer 106 outputs information on the quantization process (more specifically, information on the quantization parameter and scaling list used in the quantization process) to the entropy encoder 107 and an inverse quantizer 108.

The entropy encoder 107 entropy encodes the quantized transform coefficients that are outputted by the quantizer 106, performs data compression to generate a bitstream (encoded data), and outputs the bitstream to a decoding side. For the entropy encoding, Huffman coding, context-based adaptive binary arithmetic coding (CABAC), or the like can be used. In addition, the entropy encoder 107 performs signaling of information on the transform process from the transformer 105 with the information being included in a bitstream, to the decoding side, or performs signaling of information on the prediction process from the predictor 140 with the information being included in a bitstream, to the decoding side.

Furthermore, the entropy encoder 107 performs signaling to the decoding side with included in a bitstream a significant coefficient flag that indicates whether an encoding-target block includes a non-zero transform coefficient for each of: the first color component (the "G" component in the RGB color space, the "Y" component in the YCgCo color space); the second color component (the "B" component in the RGB color space, the "Cg" component in the YCgCo color space); and the third color component (the "R" component in the RGB color space, the "Co" component in the YCgCo color space). The significant coefficient flag is one example of the first flag.

For example, the entropy encoder 107 sets, when an encoding-target block of the "Y" component in the YCgCo color space includes a non-zero transform coefficient, the significant coefficient flag (tu_y_coded_flag) to TRUE ("1") and sets, when an encoding-target block of the "Y" component in the YCgCo color space does not include a non-zero transform coefficient, the significant coefficient flag (tu_y_coded_flag) to FALSE ("0").

The entropy encoder 107 sets, when an encoding-target block of the "Cg" component in the YCgCo color space includes a non-zero transform coefficient, the significant coefficient flag (tu_cb_coded_flag) to TRUE ("1") and sets, when an encoding-target block of the "Cg" component in the YCgCo color space does not include a non-zero transform coefficient, the significant coefficient flag (tu_cb_coded_flag) to FALSE ("0").

The entropy encoder 107 sets, when an encoding-target block of the "Co" component in the YCgCo color space includes a non-zero transform coefficient, the significant coefficient flag (tu_cr_coded_flag) to TRUE ("1") and sets, when an encoding-target block of the "Co" component in the YCgCo color space does not include a non-zero transform coefficient, the significant coefficient flag (tu_cr_coded_flag) to FALSE ("0").

In addition, the entropy encoder 107 signals a color space transform application flag (cu_act_enabled_flag) indicating whether to apply a color space transform, to the decoder side with the color space transform application flag being included in a bitstream for each encoding-target block. Such a color space transform flag is also referred to as a color space transform application flag. The color space transform application flag is one example of a second flag.

When the color space transform application flag is TRUE ("1"), it indicates that a color space transform is applied to a corresponding encoding-target block. When the color space transform application flag is FALSE ("0"), it indicates that a color space transform is not applied to a corresponding encoding-target block. Note that the entropy encoder 107 may use a color space transform non-application flag instead of the color space transform application flag. In this case, when the color space transform non-application flag is TRUE ("1"), it indicates that color space transform is not applied to a corresponding encoding-target block. When the color space transform non-application flag is FALSE ("0"), it indicates that a color space transform is applied to a corresponding encoding-target block.

The inverse quantizer/inverse transformer 130 performs an inverse quantization process and an inverse transform process in units of blocks for each color component. The inverse quantizer/inverse transformer 130 includes an inverse quantizer 18 and an inverse transformer 109.

The inverse quantizer 108 performs the inverse quantization process corresponding to the quantization process performed by the quantizer 106. More specifically, the inverse quantizer 108 inverse quantizes the quantized transform coefficients outputted by the quantizer 106 by using the quantization parameter (Qp) and the scaling list to restore the transform coefficients, and outputs the restored transform coefficients to the inverse transformer 109.

The inverse transformer 109 performs an inverse transform process corresponding to the transform process performed by the transformer 105. For example, when the transformer 105 performs discrete cosine transform, the inverse transformer 109 performs inverse discrete cosine transform. The inverse transformer 109 restores the prediction residual by performing the inverse transform process on the transform coefficients outputted from the inverse quantizer 108 and outputs a restoration prediction residual that is the restored prediction residual.

The color space inverse transformer 110 performs a color space inverse transform that is an inverse process of the color space transform performed by the color space transformer 104 and outputs a prediction residual after the color space inverse transform. More specifically, the color space inverse transformer 110 performs the following inverse transform calculation by using the Y component, Cg component, and Co component of the prediction residual after restoration, to perform an inverse transform from a YCgCo color space into an RGB color space.

$$T = Y - (Cg >> 1)$$

$$G = Cg + t$$

$$B = t - (Co >> 1)$$

$$R = Co + B$$

The scaler 111 performs an inverse process (inverse scaling process) corresponding to the chroma residual scaling performed by the scaler 103. More specifically, the scaler 111 calculates and outputs the prediction residual before the scaling, $C_{Res}$, by the scaler 103, by $C_{ResScale}/C_{Scale}$, or $C_{ResScale} \times C_{ScaleInv}$, based on the prediction residual of the chrominance component after the scaling, $C_{ResScale}$, by the scaler 103.

In the present embodiment, the scaler 111 performs the on-off control of chroma residual scaling based on the significant coefficient flag of a chrominance component (tu_cb_coded_flag, tu_cr_coded_flag) and a color space transform application flag (cu_act_enabled_flag). Details of such an on-off control of chroma residual scaling will be described later.

The combiner 112 combines the restored prediction residual with a prediction block that is outputted by the predictor 140, in units of pixels. The combiner 112 adds each pixel value of the restoration prediction residual and each pixel value of the prediction block, to restore (reconstruct) an encoding-target block and outputs the restored block. It should be noted that the restored block may be referred to as a reconstructed block.

The luminance inverse mapper 113 performs, for the restored block, an inverse mapping process corresponding to the luminance mapping process performed by the luminance mapper 101.

The in-loop filter 114 performs a filter process for the restored block and outputs the restored block after the filter process to the memory 115. The in-loop filter 114 includes a deblocking filter, a sample adaptive offset (SAO), and the like. The memory 115 stores the restored block after the filter process that is outputted by the in-loop filter 114, and accumulates the restored block as a restored image in units of frames.

The predictor 140 performs a prediction process in units of blocks for each color component. The predictor 140 performs prediction processes such as an intra prediction and an inter prediction for an encoding-target block, thereby generating a prediction block for each color component. The predictor 140 includes an intra predictor 116, an inter predictor 117, a luminance mapper 118, and a switcher 119.

The intra predictor 116 performs an intra prediction using a spatial correlation in a frame. More specifically, the intra predictor 116 generates an intra prediction block by referencing restored pixels around an encoding-target block, and outputs the generated intra prediction block. The intra predictor 116 selects an intra prediction mode that is to be applied to the encoding-target block from among a plurality of intra prediction modes, and predicts the encoding-target block by using the selected intra prediction mode.

The inter predictor 117 performs an inter prediction using a correlation between frames. More specifically, the inter predictor 117 calculates a motion vector through a scheme such as block matching by using as a reference image a restored image that is stored in the memory 115, generates an inter prediction block by predicting an encoding-target block, and outputs the generated inter prediction block. Here, the inter predictor 117 selects an optimal inter prediction method from an inter prediction using a plurality of reference images (typically, bidirectional prediction) and an inter prediction using one reference image (unidirectional prediction), and performs an inter prediction using the selected inter prediction method. The inter predictor 117 outputs information on the inter prediction (motion vector, and the like) to the entropy encoder 107.

The luminance mapper 118 performs a luminance mapping process similar to the one in the luminance mapper 101, for an inter prediction block that is outputted by the inter predictor 117.

The switcher 119 switches between an inter prediction block and an intra prediction block, and outputs either of the prediction blocks to the residual generator 102 and the combiner 112.

<Configuration of Decoding Device>

Figure 3:
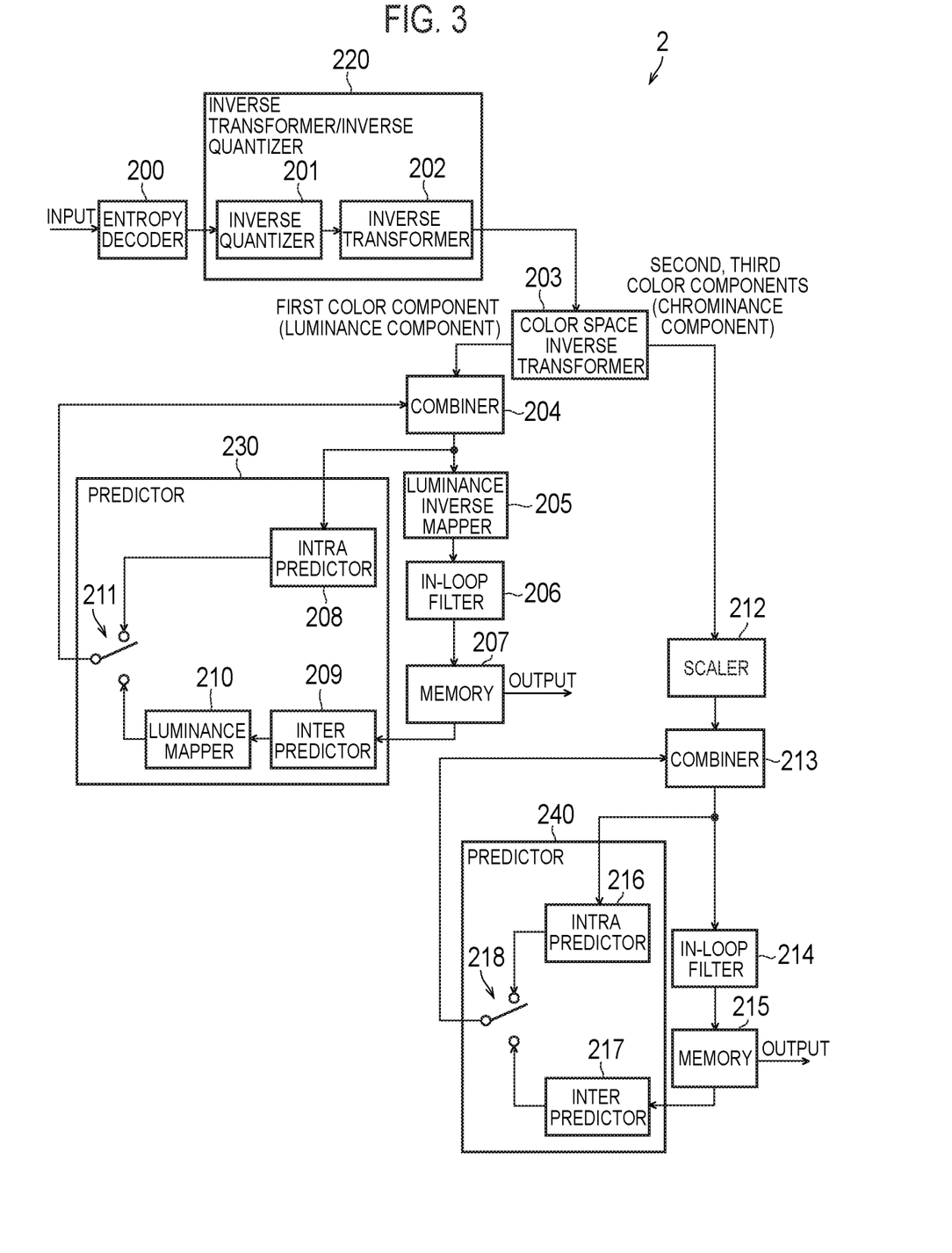
FIG. 3 is a diagram illustrating a configuration of a decoding device according to the embodiment.

Next, a decoding device according to the present embodiment is described, focusing mainly on differences from the encoding device 1. FIG. 3 is a diagram illustrating a configuration of the decoding device 2 according to the present embodiment.

As illustrated in FIG. 3, the decoding device 2 includes an entropy decoder 200, an inverse quantizer/inverse transformer 220, a color space inverse transformer 203, a combiner 204, a luminance inverse mapper 205, an in-loop filter 206, a memory 207, a predictor 230, a scaler 212, a combiner 213, an in-loop filter 214, a memory 215, and a predictor 240.

The entropy decoder 200 decodes a bitstream (input encoded data), obtains quantized transform coefficients for a decoding-target block, and outputs the obtained quantized transform coefficients to the inverse quantizer/inverse transformer 220. In addition, the entropy decoder 200 obtains information on a transform process and quantization process and information on a prediction process, outputs the information on the transform process and quantization process to the inverse quantizer/inverse transformer 220, and outputs the information on the prediction process to the predictor 230 and the predictor 240.

Furthermore, the entropy decoder 200 obtains a significant coefficient flag that indicates whether the decoding-target block includes a non-zero transform coefficient for each of: the first color component (the "G" component in the RGB color space, the "Y" component in the YCgCo color space); the second color component (the "B" component in the RGB color space, the "Cg" component in the YCgCo color space); and the third color component (the "R" component in the RGB color space, the "Co" component in the YCgCo color space). Furthermore, the entropy decoder 200 obtains a color space transform application flag (cu_act_enabled_flag) indicating whether to apply a color space transform, for each decoding-target block.

The inverse quantizer/inverse transformer 220 performs an inverse quantization process and an inverse transform process in units of blocks for each color component. The inverse quantizer/inverse transformer 220 includes an inverse quantizer 201 and an inverse transformer 202.

The inverse quantizer 201 performs an inverse quantization process corresponding to the quantization process performed by the quantizer 106 of the encoding device 1. The inverse quantizer 201 restores the transform coefficients of the decoding-target block by inversely quantizing the quantized transform coefficients outputted from the entropy decoder 200 using the quantization parameter (Qp) and the scaling list and outputs the restored transform coefficients to the inverse transformer 202.

The inverse transformer 202 performs an inverse transform process corresponding to the transform process performed by the transformer 105 of the encoding device 1. The inverse transformer 202 performs an inverse transform process for the transform coefficients that is outputted by the inverse quantizer 201, to restore and output a prediction residual.

The color space inverse transformer 203 performs, when the color space transform application flag (cu_act_enabled_flag) indicates that a decoding-target block has been encoded using color space, a color space inverse transform process that is an inverse process of the color space transform performed by the color space transformer 104 of the encoding device 1. More specifically, the color space inverse transformer 203 performs the following inverse transform calculation by using the Y component, Cg component, and Co component of the restored prediction residual.

$$T = Y - (Cg >> 1)$$

$$G = Cg + t$$

$$B = t - (Co >> 1)$$

$$R = Co + B$$

The combiner 204 combines a prediction residual of the first color component (the "G" component in the RGB color space, the "Y" component in the YCgCo color space) with a prediction block of the first color component that is outputted by the predictor 230 in units of pixels, to restore (reconstruct) an original block, and outputs a restored block of the first color component. Hereinafter, the first color component is referred to as a luminance component.

The luminance inverse mapper 205 performs, for the restored block of a luminance component, an inverse mapping process corresponding to the luminance mapping process performed by the luminance mapper 101 of the encoding device 1. The in-loop filter 206 performs a filter process for the restored block of the luminance component and outputs the restored block after the filter process to the memory 207. The in-loop filter 206 includes a deblocking filter, a sample adaptive offset (SAO), and the like.

The memory 207 stores the restored block after the filter process that is outputted by the in-loop filter 206, and accumulates the restored block as a restored image in units of frames.

The predictor 230 performs a prediction process for a luminance component in units of blocks. The predictor 230 includes an intra predictor 208, an inter predictor 209, a luminance mapper 210, and a switcher 211.

The intra predictor 208 performs an intra prediction using a spatial correlation in a frame. More specifically, the intra predictor 208 generates an intra prediction block by referencing restored pixels around a decoding-target block, and outputs the generated intra prediction block. The intra predictor 208 predicts the decoding-target block by using an intra prediction mode signaled from the encoding device 1 among a plurality of intra prediction modes.

The inter predictor 209 performs an inter prediction using a correlation between frames. More specifically, the inter predictor 209 calculates a motion vector through a scheme such as block matching by using as a reference image a restored image that is stored in the memory 207, generates an inter prediction block by predicting a decoding-target block, and outputs the generated inter prediction block. Here, the inter predictor 209 performs an inter prediction by using the inter prediction method signaled from the encoding device 1 among inter predictions including an inter prediction using a plurality of reference images and an inter prediction using one reference image.

The luminance mapper 210 performs a luminance mapping process similar to the one in the luminance mapper 101 of the encoding device 1, for an inter prediction block that is outputted by the inter predictor 209.

The switcher 211 switches between an inter prediction block and an intra prediction block, and outputs either of the prediction blocks to the combiner 204.

On the other hand, the scaler 212 performs chroma residual scaling in which the prediction residual of a chrominance component (second color component, third color component) is scaled based on a luminance component (first color component) corresponding to the chrominance component. More specifically, the scaler 212 calculates and outputs the prediction residual of a chrominance component, $C_{Res}$, by $C_{ResScale}/C_{Scale}$, Or $C_{ResScale} \times C_{ScaleInv}$, based on the prediction residual of the chrominance component, $C_{ResScale}$.

In the present embodiment, the scaler 212 performs an on-off control of chroma residual scaling based on the significant coefficient flag of a chrominance component (tu_cb_coded_flag, tu_cr_coded_flag) and color space transform application flag (cu_act_enabled_flag) that are obtained by the entropy decoder 200. Details of such an on-off control of chroma residual scaling will be described later. The combiner 213 combines the prediction residual of a chrominance component with the prediction block of the chrominance component that is outputted by the predictor 240 in units of pixels, to restore (reconstruct) an original block and outputs the restored block of the chrominance component.

The in-loop filter 214 performs a filter process for the restored block of the chrominance component and outputs the restored block after the filter process to the memory 215. The in-loop filter 214 includes a deblocking filter, a sample adaptive offset (SAO), and the like.

The memory 215 stores the restored block after the filter process that is outputted by the in-loop filter 214 and accumulates the restored block as a restored image in units of frames.

The predictor 240 performs a prediction process for a chrominance component in units of blocks. The predictor 240 includes an intra predictor 216, an inter predictor 217, and a switcher 218.

The intra predictor 216 performs an intra prediction using a spatial correlation in a frame. More specifically, the intra predictor 216 generates an intra prediction block by referencing restored pixels around a decoding-target block, and outputs the generated intra prediction block. The intra predictor 216 predicts the decoding-target block by using an intra prediction mode signaled from the encoding device 1 among a plurality of intra prediction modes.

The inter predictor 217 performs an inter prediction using a correlation between frames. More specifically, the inter predictor 217 calculates a motion vector through a scheme such as block matching by using as a reference image a restored image that is stored in the memory 215, generates an inter prediction block by predicting a decoding-target block, and outputs the generated inter prediction block. Here, the inter predictor 217 performs an inter prediction by using an inter prediction method signaled from the encoding device 1 among inter predictions including an inter prediction using a plurality of reference images and an inter prediction using one reference image.

The switcher 218 switches between an inter prediction block and an intra prediction block, and outputs either of the prediction blocks to the combiner 213.

<On-Off Control of Chroma Residual Scaling>

Next, the on-off control of chroma residual scaling according to the present embodiment will be described.

As described above, when a color space transform is applied, the transform coefficients transmitted to the decoding device 2 are of the YCgCo color space and tu_cb_coded_flag is set to TRUE ("1") when a non-zero transform coefficient of a Cg component is present and tu_cr_coded_flag is set to TRUE ("1") when a non-zero transform coefficient of a Co component is present.

When a non-zero transform coefficient is present in any of the color components of Y, Cg, and Co, the energy thereof is distributed to each color component in an RGB color space through a color space inverse transform process by the color space inverse transformer 203 in the decoding device 2 and therefore, it is highly likely to generate a prediction residual in all the color components in the RGB color space.

In the present embodiment, the scaler 212 of the decoding device 2 performs an on-off control of chroma residual scaling in consideration of not only tu_cb_coded_flag and tu_cr_coded_flag but also the color space transform application flag (cu_act_enabled_flag). More specifically, the scaler 212 performs chroma residual scaling when the color space transform application flag (cu_act_enabled_flag) is TRUE ("1") irrespective of the significant coefficient flags of chrominance components (tu_cb_coded_flag, tu_cr_coded_flag). This allows chroma residual scaling to be properly applied, which can improve the encoding efficiency.

That is, the decoding device 2 according to the present embodiment is a device that performs a decoding process for a decoding-target block obtained by dividing an original image including a plurality of color components and includes the entropy decoder 200, the inverse quantizer/inverse transformer 220, the color space inverse transformer 203, and the scaler 212.

First, the entropy decoder 200 decodes a bitstream and thereby outputs transform coefficients for each color component of a decoding-target block a significant coefficient flag (tu_cb_coded_flag, tu_cr_coded_flag) indicating whether the decoding-target block includes a non-zero transform coefficient for each color component and a color space transform application flag (cu_act_enabled_flag) indicating whether the decoding-target block has been encoded using a color space transform of transforming the color space of a prediction residual from the color space of an original image to another color space. Hereinafter, each of tu_cb_coded_flag and tu_cr_coded_flag will be simply referred to as "tuCbfChroma flag" without particularly distinguishing the second color component and the third color component from each other.

Second, the inverse quantizer/inverse transformer 220 restores a prediction residual from transform coefficients for each color component.

Third, the color space inverse transformer 203 performs, when the color space transform application flag (cu_act_enabled_flag) indicates that the decoding-target block has been encoded using a color space transform, a color space inverse transform for the restored prediction residual.

Fourth, the scaler 212 performs chroma residual scaling in which the prediction residual of a chrominance component is scaled based on the luminance component corresponding to the chrominance component. Here, the scaler 212 determines whether to perform a chroma residual scaling, based on the tuCbfChroma flag and the color space transform application flag (cu_act_enabled_flag).

Figure 4:
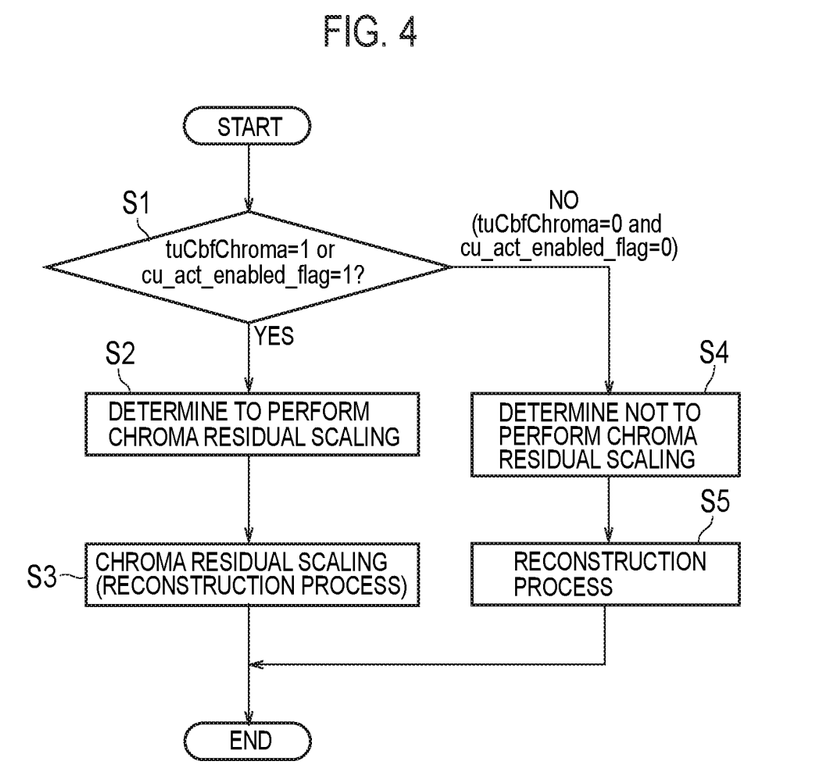
FIG. 4 is a diagram illustrating an on-off control of chroma residual scaling according to the embodiment.

FIG. 4 is a diagram that illustrates the on-off control of chroma residual scaling according to the present embodiment.

As illustrated in FIG. 4, when the color space transform application flag (cu_act_enabled_flag) indicates that the decoding-target block has been encoded using a color space transform, that is, when cu_act_enabled_flag=TRUE("1") (step S1: YES), the scaler 212 determines to perform chroma residual scaling (step S2). In this case, the scaler 212 and the combiner 213 perform a chrominance block reconstruction process involving chroma residual scaling (step S3).

In addition, when the tuCbfChroma flag indicates that the decoding-target block of a chrominance component includes a non-zero transform coefficient, that is, when tuCbfChroma flag=TRUE("1") (step S1: YES), the scaler 212 determines to perform chroma residual scaling (step S2). In this case, the scaler 212 and the combiner 213 perform a chrominance block reconstruction process involving chroma residual scaling (step S3).

On the other hand, when the tuCbfChroma flag indicates that the decoding-target block of a chrominance component does not includes a non-zero transform coefficient and the color space transform application flag (cu_act_enabled_flag) indicates that the decoding-target block has not been encoded using a color space transform, that is, when tuCbfChroma flag=FALSE ("0") and cu_act_enabled_flag=FALSE ("0") (step S1: NO), the scaler 212 determines not to perform chroma residual scaling (step S4). In this case, the scaler 212 and the combiner 213 perform a chrominance block reconstruction process not involving chroma residual scaling (step S5).

As described above, the scaler 212 according to the present embodiment performs chroma residual scaling when the color space transform application flag (cu_act_enabled_flag) is TRUE ("1") irrespective of the significant coefficient flag of a chrominance component (tu_cb_coded_flag, tu_cr_coded_flag). This allows chroma residual scaling to be properly applied, which can improve the encoding efficiency.

Other Embodiments

A program may be provided to cause a computer to execute the operations of the image encoding device 1. A program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM for example.

The encoding device 1 may be embodied as a semiconductor integrated circuit (chipset, SoC, etc.) by integrating the circuits that execute the respective operations of the encoding device 1. The decoding device 2 may be embodied as a semiconductor integrated circuit (chipset, SoC, etc.) by integrating the circuits that execute the respective operations of the decoding device 2.

The embodiments have been described in detail above with reference to the drawings. Specific configurations are not limited to the above-described configurations, and various design changes, and the like are possible within the scope not deviating from the gist.

The invention claimed is:

1. A decoding device that performs a decoding process for a block obtained by dividing an original image including a plurality of color components, the decoding device comprising:
   an entropy decoder configured to decode a bitstream and thereby output
   transform coefficients being for each color component of the block,
   a first flag indicating for each color component whether the block includes a non-zero transform coefficient, and
   a second flag indicating whether a prediction residual transform process is applied to the block, the prediction residual transform process being a process generating a new prediction residual for each color component by a process using prediction residuals of two or more color components;
   an inverse quantizer/inverse transformer configured to restore the prediction residual from the transform coefficients for each color component;
   a prediction residual transformer configured to perform the prediction residual transform process for the prediction residual, when the second flag indicates that the prediction residual transform process is applied to the block; and
   a scaler configured to perform chroma residual scaling that performs scaling the prediction residual of a chrominance component based on a luminance component corresponding to the chrominance component, wherein
   the scaler is configured to perform the chroma residual scaling in response to the first flag indicating that a block of the chrominance component does not include a non-zero transform coefficient and the second flag indicating that prediction residual transform process is applied to the block.

2. A non-transitory computer-readable storage medium with an executable program stored thereon, wherein the program causes a computer to function as the decoding device according to claim 1.

3. A decoding method for performing a decoding process on a block obtained by dividing an original image including a plurality of color components, the method comprising:
   decoding a bitstream and thereby outputting
   transform coefficients being for each color component of the block,
   a first flag indicating for each color component whether the block includes a non-zero transform coefficient, and
   a second flag indicating whether a prediction residual transform process is applied to the block, the prediction residual transform process being a process generating a new prediction residual for each color component by a process using prediction residuals of two or more color components;

performing the prediction residual transform process for the prediction residual restored from the transform coefficients, when the second flag indicates that the prediction residual transform process is applied to the block; and performing a chroma residual scaling in response to the first flag indicating that a block of a chrominance component does not include a non-zero transform coefficient and the second flag indicating that prediction residual transform process is applied to the block, the chroma residual scaling performing scaling the prediction residual of the chrominance component based on a luminance component corresponding to the chrominance component.

* * * * *